US007015605B1

(12) United States Patent
Peter et al.

(10) Patent No.: US 7,015,605 B1
(45) Date of Patent: Mar. 21, 2006

(54) ELECTROMOTIVE DRIVE SYSTEM FOR USE WITH A PUMP OF A POWER-ASSISTED STEERING SYSTEM IN A MOTOR VEHICLE

(75) Inventors: Cornelius Peter, Bühl (DE); Johann Von Der Heide, Schramberg (DE); Michael Petach, Redondo Beach, CA (US)

(73) Assignee: TRW Automotive Electronics & Components GmbH & Co. KG, (DE)

( * ) Notice: Subject to any disclaimer, the term of this patent is extended or adjusted under 35 U.S.C. 154(b) by 0 days.

(21) Appl. No.: 09/831,287

(22) PCT Filed: Oct. 29, 1999

(86) PCT No.: PCT/DE99/03472

§ 371 (c)(1),
(2), (4) Date: Aug. 27, 2001

(87) PCT Pub. No.: WO00/28641

PCT Pub. Date: May 18, 2000

(30) Foreign Application Priority Data

Nov. 5, 1998 (DE) .............................. 198 51 0608

(51) Int. Cl.
*H02K 5/24* (2006.01)
*H02K 21/22* (2006.01)

(52) U.S. Cl. ...................... 310/51; 310/67 R; 310/71

(58) Field of Classification Search ............... 310/51, 310/67 R, DIG. 6, 89, 71, 90; 360/97.04, 360/99.08; 417/423.7, 423.14

See application file for complete search history.

(56) References Cited

U.S. PATENT DOCUMENTS

| 4,647,803 A | * | 3/1987 | von der Heide et al. ..... 310/51 |
| 4,975,607 A | * | 12/1990 | Hara et al. ................ 310/67 R |
| 5,006,765 A | * | 4/1991 | Schmider ..................... 310/71 |
| 5,008,573 A | * | 4/1991 | Beppu et al. ............. 310/67 R |
| 5,365,388 A | * | 11/1994 | Maughan et al. ........ 360/99.04 |
| 5,376,850 A | | 12/1994 | Elsing et al. ............. 310/67 R |
| 5,694,268 A | | 12/1997 | Dunfield et al. ......... 360/98.07 |
| 5,747,908 A | | 5/1998 | Saneshige et al. ............ 310/91 |
| 5,798,887 A | * | 8/1998 | Yoshida et al. .......... 360/99.08 |

(Continued)

FOREIGN PATENT DOCUMENTS

GB     2 293 695 A2     4/1996

(Continued)

OTHER PUBLICATIONS

Translation of Takahashi (JP 05-199721), "brushless dc motor", Aug. 6, 1993.*

(Continued)

*Primary Examiner*—Karl Eizo Tamai
(74) *Attorney, Agent, or Firm*—Fay, Sharpe, Fagan, Minnich & McKee, LLP

(57) ABSTRACT

An electromotive drive is provided, especially for the pump of a power-assisted steering system of a motor vehicle. The drive includes a housing (3) with a bearing journal (15) in which the shaft (18) of a rotor (9) is rotationally mounted. The drive also includes a stator (7) having drive windings. The bearing journal (15) extends through said stator and supports it. The stator (7) is supported by the bearing journal (15), substantially in the transversal direction only. The stator (7) is coupled with the remaining housing (3) in a rotationally fixed manner, so as to transmit the engine torque. The arrangement dramatically reduces disturbing noises which occur especially when the motor is operated at full load and which are caused by relatively high-frequency torque variations.

26 Claims, 2 Drawing Sheets

U.S. PATENT DOCUMENTS 5,942,821 A * 8/1999 Shin .................... 310/67 R
6,281,607 B1 * 8/2001 Petach et al. ................ 310/51

FOREIGN PATENT DOCUMENTS

| JP | 5-199721 | 8/1993 | |
| JP | 09-149602 | * | 6/1997 |
| JP | 10-14187 | | 1/1998 |

OTHER PUBLICATIONS

International Search Report No. PCT/DE99/03472.

* cited by examiner

ELECTROMOTIVE DRIVE SYSTEM FOR USE WITH A PUMP OF A POWER-ASSISTED STEERING SYSTEM IN A MOTOR VEHICLE

BACKGROUND OF THE INVENTION

The invention relates to an electromotive drive system especially suited for use with a pump of a power-assisted steering system of a motor vehicle of the type having a housing, a shaft support containing a shaft on which a rotor is rigidly affixed, and a stator with drive windings which is traversed and retained by the shaft support.

As a rule, electromotive pumps are employed with power-assisted steering systems. In these pumps, the motors are typically designed in such a manner that the pumps are operated at full load for only brief periods of time. When the prior art motors with integrated hydraulic power-assisted steering system pumps are operated at full load, is disturbing whistling noises are often generated which are attributable to relatively high frequency torque variations.

Known electromotive drives and pumps have an electric motor including a stator and a rotor. The rotor is typically an external rotor that encompasses the stator. The stator is positioned on a shaft support which extends through the stator and is firmly connected with the stator. In addition, for transmission of the torque from the stator to the remaining housing, an axial split pin is installed between the stator and the shaft support. The axial pin is arranged between opposite recesses formed in the interior wall of the stator and the exterior wall of the shaft support. At the underside of the stator, the connecting contacts of the stator windings are joined with a base plate arranged between the stator and the bottom of the housing. The control electronics for the motor or the pump are also typically arranged on the base plate.

In prior art motors, the axial split pin is provided for non-positive and positive coupling of the stator and the shaft support. The axial split pin engages with corresponding grooves in the inner wall of the stator and the outer wall of the shaft support. The split pin of the prior art creates a rigid coupling between the rotor masses and the mass of the remaining drive. As a result, the resonant frequency of the combined stator and shaft support system lies within the range of the high frequency torque variations occurring during operation. Thus, the stator/shaft arrangement of the prior art systems are incited to produce disturbing, noise-producing vibrations.

Proceeding from said state of the art, it is an object of the invention to create an electromotive drive system, and particularly an electromotive drive for the pump of a power-assisted steering system of a motor vehicle, for which the disturbing noises occurring with known drives are drastically reduced or prevented.

SUMMARY OF THE INVENTION

The invention proceeds from the recognition that the disturbing noises are typically created by the substantially rigidly coupled stator/shaft support system, which generates a "tuning fork" effect when the resonant frequency of the system falls in the range of the unavoidable high frequency torque vibrations. Such torque variations or vibrations are practically unavoidable with electric motors and which have sufficient amplitude to lead to the disturbing noises, especially when the pump is operated with a full load.

According to one aspect of the invention, the rigid coupling between the stator and the shaft support is eliminated with respect to torque transmission. The transmission of torque moment occurs essentially only via the coupling of the stator with the remaining housing and not through the shaft support. The shaft support serves only for positioning the stator in the plane which extends transversely in relation to the shaft support. In the present invention, elimination of the split pin or similar coupling means causing the rigid coupling has resulted in a clear reduction of the disturbing noises.

An improved suppression of the disturbing noises is obtained by providing a gap between the interior wall of the stator and the outer wall of the shaft support. The gap is preferably filled at least partially with a viscous medium. Alternatively, or in addition, vibration-absorbing elements are preferably included, for example O-rings, for bridging the gap and coupling the stator and the shaft support. The coupling, however, preferably does not substantially transmit torque. As a result of these measures, further improved noise suppression is achieved. Preferably, the substantially reduced torque transmission at the coupling between the stator and the shaft support alters the resonance properties, e.g. the resonant frequency and damping, of the rotor/shaft support system such that the disturbing noises are essentially eliminated.

In a preferred embodiment, the torque transmission from the stator to the remaining housing takes place via a supporting base plate. The base plate preferably includes a punched-out grid. The stator is mounted onto the supporting base plate. This arrangement results in a very simple installation, while at the same time substantially dampens high frequency torque variations or vibrations through the flexibility and damping properties of the base plate, and the overall stator/base plate system. Vibrations of the entire housing, and the detrimental excitation of the rotor/shaft support system potentially excited thereby, are thus reduced or suppressed.

In the present invention, in order to avoid a mechanical overload of the base plate, particularly in the case of a base plate having small dimensions, a means is preferably provided at the base plate for non-positive and/or positive torque transmission to the remaining housing. For example, the means include one or more of a surface roughening, denticulation, and fluting on the underside of the base plate. These features produce, in conjunction with appropriate press-on pressure of the plate against the housing, an improved coupling for torque transmission. The roughening, denticulation, or fluting are provided, as desired, at non-plastic-coated conductor tracks of the punched-out grid of the supporting base plate. In this manner, simultaneous electrical contacting of the housing occurs, for example by mass potential.

BRIEF DESCRIPTION OF THE DRAWINGS

The invention may take form in various components and arrangements of components, and in various steps and arrangements of steps. The drawings are only for the purpose of illustrating preferred embodiment and are not to be construed as limiting the invention.

DETAILED DESCRIPTION OF THE PREFERRED EMBODIMENT

Figure 1:
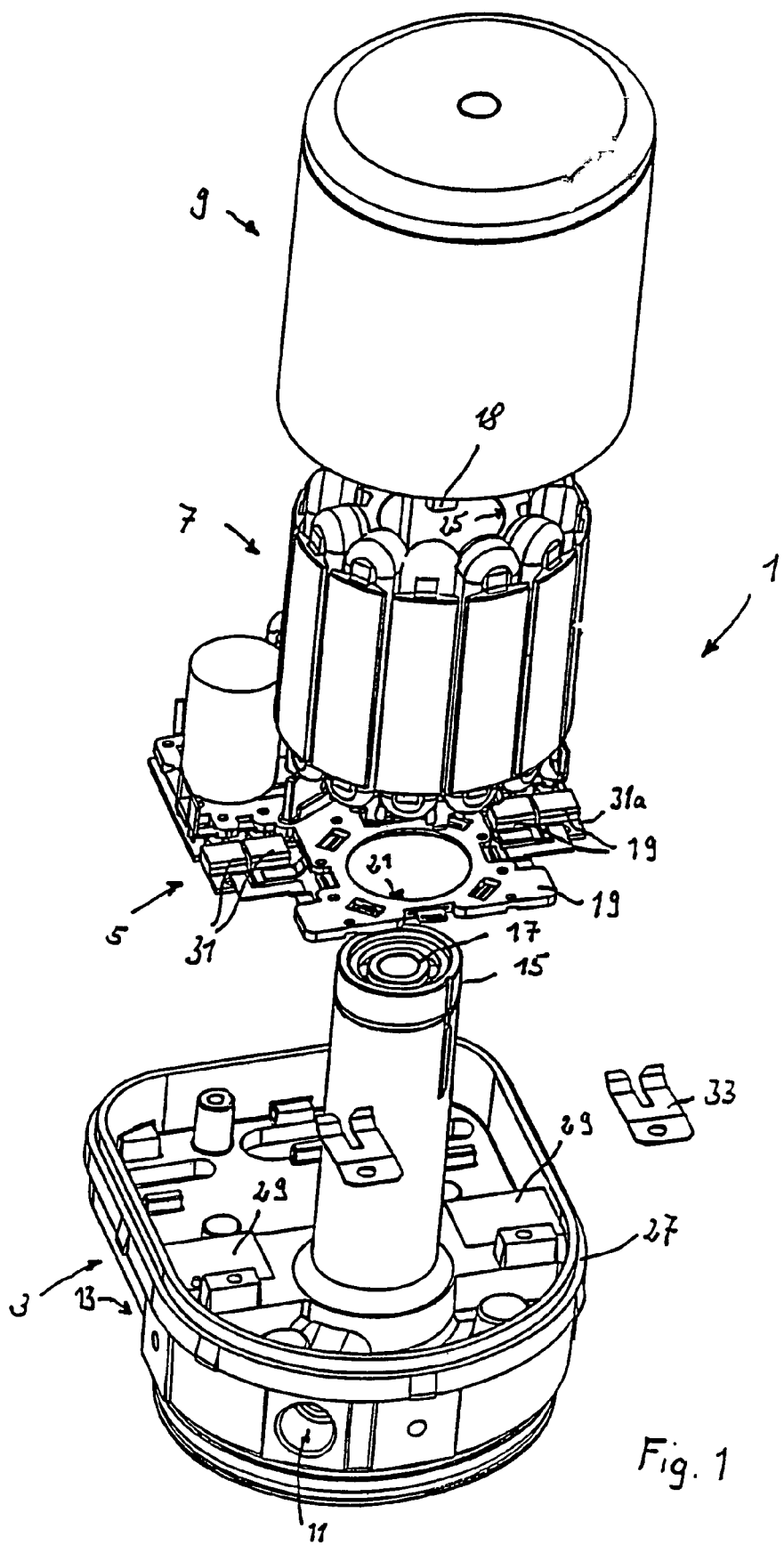
FIG. 1 is a perspective exploded view of the basic components of an electromotively driven pump with a drive in accordance with one embodiment of the invention.
Figure 2:
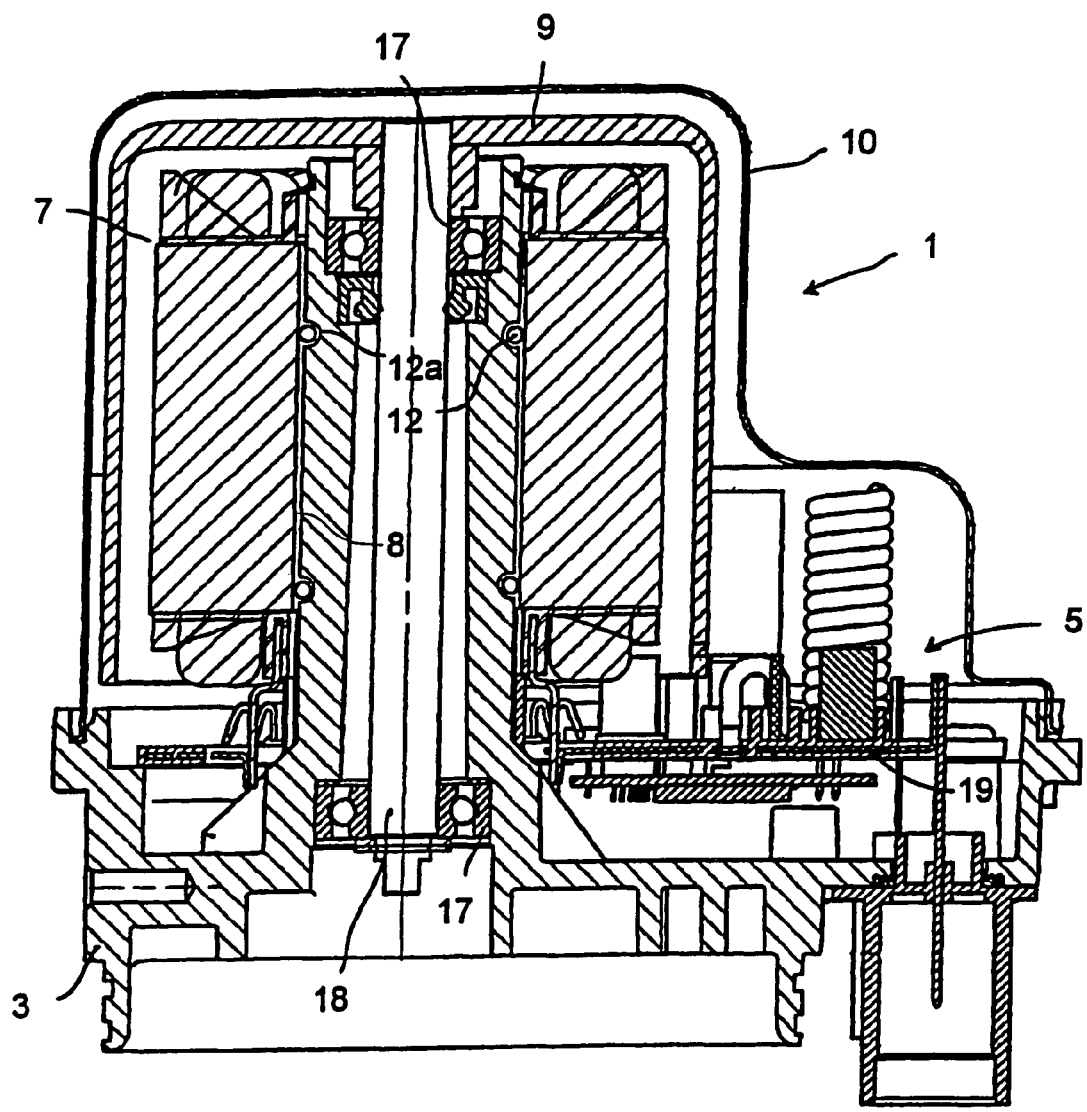
FIG. 2 is a central, vertical longitudinal sectional view of the embodiment of FIG. 1 in the fully assembled state.

FIG. 1 depicts an electromotively driven pump 1 which includes a housing 3, an electronic control unit 5, a stator 7 and a rotor 9. A protective hood 10 (FIG. 2) joins with the housing 3 and covers the motor. Although the invention will be described with particular reference to the illustrated preferred pump embodiment as shown in FIGS. 1 and 2, the drawings are exemplary only and are not to be construed as limiting the invention to any particular application.

The housing 3 contains the pumping mechanism and has in an anterior wall a high pressure outlet 11 and in a rear wall an inlet 13 in the area indicated in FIG. 1.

A cylindrical shaft support 15 extends upwardly from the bottom of the housing 3. The shaft support 15 contains the driven shaft 18. The shaft 18 is supported in the shaft support 15 by bearings 17. The shaft 18 drives the pumping mechanism. The housing 3 preferably consists of aluminum or magnesium cast metal.

The electronic control unit 5 is arranged in the housing 3. The electronic control unit 5 includes a base plate 19 onto which the mechanical, electrical, electro-mechanical and electronic components are attached. The base plate 19 has a recess 21 which engages the shaft support 15 of the housing 3. The base plate 19 includes an extrusion-coated punched-out grid which supports high current densities, and a printed conductor plate for conducting low current densities.

The motor includes a stator 7 having stator windings. The stator 7 also has an axial recess 25 which receives the shaft support 15 of the housing 3. The stator 7 is rigidly fastened to the base plate 19, e.g. via a punched-out grid. For example, the stator 7 may be fastened to the base plate 19 by soldering or welding the contact connections of the stator 7 windings to the conductor tracks of the punched-out grid.

The rotor 9 is constructed as an external rotor and is rotationally arranged in the housing 3 by a rigid connection to the shaft 18 which in turn is held by the bearings 17. The rotor 9 joined with the drive shaft 18 by any suitable appropriate fashion.

The entire arrangement is preferably covered by the protective hood 10 as shown in FIG. 2. The protective hood 10 connects with a collar 27 of a lateral wall of the housing 3.

A pair of receptacles 29 are provided in the housing 3 and are adapted to receive power semiconductors 31 of the electronic control unit 5. The power semiconductors 31 are preferably power FET's. The power FET's normally have small heat sinks 31a which cannot guarantee adequate heat transfer.

To that end, the small heat sinks 31a are disposed on the receptacles 29 in the housing 3 and are so arranged as to have sufficient thermal contact with the housing 3 using any suitable means.

Since the heat sinks 31a of the power semiconductors 31 also preferably function as electrical contacts, there is preferably provided an electrically insulating but thermally conducting layer between a back side of the small heat sinks 31a and the receptacles 29. Alternatively, a direct electrically conducting contact between the heat sinks 31a and the housing 3 is established, conditional upon the heat sinks 31a not simultaneously acting as electrical contacts.

In the particular represented embodiment, two power semiconductors 31 are included, and are attached to the receptacles 29 by elastic clamps 33.

The regions of the housing 3 below the receptacles 29 preferably have one or more channels through which flows the fluid to be transported by the pump 1. These regions thus act as heat exchangers for transferring heat out of the power semiconductors 31. Of course, other measures known to the art can also be incorporated for improving the heat sinking of the power semiconductors 31. For example, it is preferable to maximize the area through which the fluid is transported in the regions below the receptacles 29. A plurality of channels can be provided to increase the heat transfer. Additionally, one or more channels preferably includes interior cooling fins.

In order to avoid noises which develop with the prior art drives in use heretofore, which noises are caused by relatively high frequency variations of the generated torque moment, the stator 7 is not joined directly to the shaft support 15. Rather, the shaft support 15 and the stator 7 are arranged such that a gap exists between an inner wall of the stator 7 and an outer wall of the shaft support 15.

In order to attain adequate fixation of the stator 7 while yet providing the gap, one or more O-rings 12 are arranged in grooves 12a in the outer wall of the shaft support 15. The O-rings 12 are preferably sufficiently flexible to minimize undesired rigid coupling between the stator 7 and the shaft support 15. The O-rings 12 preferably have flexibility and produce a dampening effect, thus acting as vibration-damping coupling elements between the stator 7 and the shaft support 15.

In place of the O-rings 12 or in addition to these O-rings, the gap may also be filled partially with a viscous medium such as a grease, which also avoids or further reduces the rigidity of the coupling.

It is to be appreciated that in the preferred embodiment, a substantially rigid coupling between the stator 7 and the shaft support 15 is avoided, as a rigid coupling would support tangential power transmission or the transmission of the torque from the stator 7 to the shaft support 15.

According to the embodiment illustrated in FIGS. 1 and 2, the torque moment is not transmitted from the stator 7 through the shaft support 15. Rather, the torque moment is transmitted directly to the housing 3, and, more specifically, to the bottom of the housing 3. The shaft support 15, aside from providing a mounting for the rotor shaft 18, serves only to provide axial control or stabilization of the stator 7.

According to the embodiment illustrated in FIGS. 1 and 2, the stator 7 is firmly joined with the supporting base plate 19. As mentioned previously, this joining is preferably realized by soldering or welding of connection contacts to the conductor tracts of the punched-out grid of base plate 19.

Since the base plate 19 is firmly mounted, together with the attached stator 7 in the housing 3, the torque moment transmission from the stator 7 to the to the housing 3 takes place via the base plate 19. This arrangement produces an additional benefit in that the base plate 19, which typically has some flexibility, acts to dampen the high frequency variations of the transmitted torque. This additional benefit is obtained in particular when the base plate 19 is at least partially formed as an extrusion plastic-coated punched-out grid.

The vibration dampening properties of the base plate 19 are particularly evident when the base plate 19 is not rigidly connected over its entire area with the housing 3, but rather is connected only in certain selected areas or spots, e.g. is connected by means of screws.

In order to provide reliable safe transmission of torque moment and to avoid a mechanical overload or destruction of the base plate 19, the base plate 19 is preferably appropriately dimensioned, or additional measures are preferably taken to promote transmission of torque. To that end, in the preferred embodiment means is preferably provided on the base plate 19, preferably in the attachment region of the stator 7, for positive and/or non-positive coupling with the housing 3. Said means are, preferably, a surface roughening or denticulation disposed on the underside of the base plate 19, which act in conjunction with press-on forces operating in these regions to provide improved torque moment transmission to the housing 3. This roughening or denticulation is preferably provided on non-plastic coated conductor tracts. These conductor tracts therefore also selectively act as electrical contacts with the housing 3.

Extensions which extend downwardly are also selectively provided at the underside of the plate as desired to promote torque transmission. Such extensions preferably cooperate with stops provided in the housing 3 for the transmission of torque moment.

Overall, as a result of the inventive construction, undesirable noise-producing vibrations of prior art stator/shaft support systems are avoided. The shaft support 15 serves only for axial and transverse fixation of the stator 7, while transmission of the torque moment occurs through a twist-proof fastening of the stator in the housing 3, preferably by means of a base plate 19.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

The invention claimed is:

1. An electromotive drive comprising:
   a housing having an upwardly extending shaft support;
   a base plate attached to the housing at selected areas of the base plate less than an entire area of the base plate, the base plate comprising an extrusion-coated punched-out grid;
   a stator surrounding the shaft support and being attached to the base plate whereby torque transmission occurs from the stator to the housing through the base plate and high frequency vibrations of said torque transmission are dampened by the punched-out grid;
   a shaft rotatably arranged within the shaft support;
   a rotor attached to the shaft and surrounding the stator; and,
   a resilient member disposed between an inner wall of the stator and an outer wall of the shaft support whereby a gap is created between the stator and the shaft support.

2. The electromotive drive as set forth in claim 1, further including a viscous medium disposed in the gap.

3. The electromotive drive as set forth in claim 1, wherein the coupling includes grease material disposed in the gap.

4. The electromotive drive as set forth in claim 1, further including at least one flexible element which bridges the gap.

5. The electromotive drive as set forth in claim 4, wherein the at least one flexible element includes a vibration damping element.

6. The electromotive drive as set forth in claim 4, wherein:
   grooves are provided in the outer wall of the shaft support; and,
   the at least one flexible element includes an O-ring retained in said grooves.

7. The electromotive drive as set forth in claim 6, wherein the torque coupling means further includes at least one conductor tract of the punched-out grid.

8. The electromotive drive as set forth in claim 7, wherein the conductor tract additionally serves for establishing electrical contact between the housing and the stator.

9. The electromotive drive as set forth in claim 8, wherein the base plate further includes a plastic extrusion coating.

10. The electromotive drive as set forth in claim 1, wherein the base plate includes torque coupling means disposed adjacent the base plate for torque coupling between the base plate and the housing.

11. An electromotive drive comprising:
    a housing;
    a shaft support extending from said housing;
    a base plate attached to the housing at selected areas of the base plate, the base plate including an extrusion-coated punched-out grid;
    a stator spaced apart from the shaft support defining a gap therebetween, the stator being directly attached to the base plate whereby a torque moment is transmitted from said stator to said housing through said base plate whereby high frequency torque variations are dampened by dampening properties of said extrusion-coated punched-out grid forming said base plate;
    a shaft rotatably disposed within the shaft support;
    a rotor attached with the shaft; and
    a resilient member disposed between the stator and the shaft support.

12. The electromotive drive as set forth in claim 11, wherein the resilient member includes a viscous medium disposed in the gap.

13. The electromotive drive as set forth in claim 11, wherein the resilient member includes at least one O-ring arranged in the gap.

14. The electromotive drive as set forth in claim 11, wherein the resilient member includes a vibration damping means for damping vibrations of said stator.

15. A pump motor, operative in conjunction with a pump for a hydraulic system of a motor vehicle, the pump motor comprising:
    a housing including an elongate shaft support;
    a stator surrounding the shaft support;
    a base plate including an extrusion-coated punched-out grid and a printed conductor plate, the base plate being rigidly connected to the housing and providing a route of torque transmission between the stator and the housing and providing dampening between the stator and the housing, the base plate having an area and a selected portion of said area not contacting said housing;
    a shaft rotatable within the shaft support;
    a rotor attached with the shaft; and
    a flexible coupling disposed between the stator and the shaft support.

16. The pump motor as set forth in claim 15, wherein:
    the stator and the shaft support together define a gap therebetween; and
    the coupling is disposed within the gap.

17. The pump motor as set forth in claim 15, wherein said base plate is not connected to said housing over an entire area of the base plate.

18. The pump motor as set forth in claim 15, wherein said base plate is connected to said housing at selected conductor tract areas of the base plate.

19. An electromotive drive comprising:
    a housing having an elongate shaft support defining an axis;
    a base plate attached to the housing, the base plate including punched-out grid;

a stator operatively connected with the shaft support in a manner to prevent relative movement between the stator and the shaft support in directions transverse said axis, and being attached to the base plate whereby torque transmission occurs from the stator to the housing through the base plate and high frequency vibrations of said torque transmission are dampened by the punched-out grid;

a shaft rotatably arranged within the shaft support;

a rotor operatively connected with the shaft and surrounding the stator; and, a resilient member disposed between an inner wall of the stator and an outer wall of the shaft support whereby a gap is created between the stator and the shaft support.

20. The electromotive drive as set forth in claim 19, further including a viscous medium disposed in the gap.

21. The electromotive drive as set forth in claim 19, wherein the resilient member includes a vibration damping element.

22. The electromotive drive as set forth in claim 19, wherein the punched-out grid is an extrusion coated punched-out grid.

23. An electromotive drive comprising:

a housing;

a shaft support extending from said housing;

a punched-out grid attached to the housing;

a stator spaced apart from the shaft support defining a gap therebetween, the stator being attached to the grid whereby a torque moment is transmitted from said stator to said housing through said grid whereby high frequency torque variations are dampened by dampening properties of said grid forming;

a shaft rotatably disposed within the shaft support;

a rotor attached with the shaft; and, a resilient member disposed between the stator and the shaft support.

24. The electromotive drive as set forth in claim 23, wherein the resilient member includes a viscous medium disposed in the gap.

25. The electromotive drive as set forth in claim 24, wherein the resilient member includes a vibration dampening means for dampening vibrations of said stator.

26. A motor comprising:

a housing including an elongate shaft support;

a stator surrounding the shaft support;

a base plate including a punched-out grid and a printed conductor plate, the base plate being connected with the housing and providing a route of torque transmission between the stator and the housing and providing dampening between the stator and the housing;

a shaft rotatable within the shaft support;

a rotor attached with the shaft; and, means located between the stator and the shaft support for reducing relative movement between the stator and the shaft support for reducing relative movement between the stator and the shaft support for dampening vibrations of said stator.

* * * * *